United States Patent
Miyabe et al.

(10) Patent No.: US 12,017,433 B2
(45) Date of Patent: *Jun. 25, 2024

(54) MULTILAYERED ARTICLE AND MULTILAYERED CONTAINER

(71) Applicant: Mitsubishi Gas Chemical Company, Inc., Tokyo (JP)

(72) Inventors: Takanori Miyabe, Hiratsuka (JP); Takafumi Oda, Hiratsuka (JP); Jin Nakamura, Hiratsuka (JP); Masaki Yamanaka, Hiratsuka (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 460 days.

This patent is subject to a terminal disclaimer.

(21) Appl. No.: 17/049,754

(22) PCT Filed: Apr. 22, 2019

(86) PCT No.: PCT/JP2019/017035
§ 371 (c)(1),
(2) Date: Oct. 22, 2020

(87) PCT Pub. No.: WO2019/208500
PCT Pub. Date: Oct. 31, 2019

(65) Prior Publication Data
US 2021/0046744 A1  Feb. 18, 2021

(30) Foreign Application Priority Data

Apr. 24, 2018 (JP) ................................. 2018-082856

(51) Int. Cl.
*B32B 27/34* (2006.01)
*B32B 27/08* (2006.01)
(Continued)

(52) U.S. Cl.
CPC .............. *B32B 27/08* (2013.01); *B32B 27/34* (2013.01); *B32B 27/36* (2013.01); *B29C 49/06* (2013.01);
(Continued)

(58) Field of Classification Search
CPC ......... B32B 27/08; B32B 27/34; B32B 27/36; B32B 2250/02; B32B 2250/24;
(Continued)

(56) References Cited

U.S. PATENT DOCUMENTS 4,433,136 A  2/1984 Miyamoto et al.
4,438,257 A  3/1984 Miyamoto et al.
(Continued)

FOREIGN PATENT DOCUMENTS

CN  101331021 A  12/2008
CN  101360601 A  2/2009
(Continued)

OTHER PUBLICATIONS

Office Action issued in corresponding Chinese Application No. 201980027178.6 dated Jan. 5, 2022 (9 pages).
(Continued)

*Primary Examiner* — John D Freeman
(74) *Attorney, Agent, or Firm* — Fitch, Even, Tabin & Flannery LLP (57) ABSTRACT

Provided is a multilayered article and a multilayered container having excellent delamination resistance while maintaining an excellent oxygen barrier property. The multilayered article includes a polyester resin layer and a barrier layer, wherein a polyamide resin contained in the barrier layer contains from 90 to 10 parts by mass of a polyamide resin (B) per 10 to 90 parts by mass of a polyamide resin (A). In the polyamide resin (A), 70 mol % or more of structural unit derived from a diamine is derived from xylylenedi-
(Continued)

amine, and over 90 mol % of structural unit derived from a dicarboxylic acid is derived from adipic acid. In the polyamide resin (B), 70 mol % or more of structural unit derived from a diamine is derived from xylylenediamine, and of structural unit derived from a dicarboxylic acid, from 30 to 65 mol % is derived from an am-linear aliphatic dicarboxylic acid having from 4 to 20 carbons and from 70 to 35 mol % is derived from isophthalic acid.

21 Claims, 1 Drawing Sheet (51) Int. Cl.
*B32B 27/36* (2006.01)
*B29C 49/06* (2006.01)
*B29C 49/22* (2006.01)

(52) U.S. Cl.
CPC .......... *B29C 49/22* (2013.01); *B32B 2250/02* (2013.01); *B32B 2250/24* (2013.01); *B32B 2270/00* (2013.01); *B32B 2307/412* (2013.01); *B32B 2307/518* (2013.01); *B32B 2307/546* (2013.01); *B32B 2307/7244* (2013.01); *B32B 2439/60* (2013.01)

(58) Field of Classification Search
CPC ........ B32B 2307/412; B32B 2307/546; B32B 2367/00; B32B 2377/00; B32B 2439/60; B32B 2250/03; B32B 2270/00; B32B 2307/518; B32B 2307/7244; B65D 1/02; B65D 1/0215; B29C 49/06; B29C 49/22; C08G 69/265
See application file for complete search history.

(56) References Cited

U.S. PATENT DOCUMENTS

| | | | |
|---|---|---|---|
| 4,908,272 | A | 3/1990 | Harada et al. |
| 5,175,238 | A | 12/1992 | Matlack et al. |
| 2005/0009976 | A1 | 1/2005 | Akkapeddi et al. |
| 2006/0197246 | A1 | 9/2006 | Hale et al. |
| 2007/0154668 | A1 | 7/2007 | Rhee et al. |
| 2009/0277858 | A1 | 11/2009 | Mitadera et al. |
| 2010/0233401 | A1 | 9/2010 | Mitadera et al. |
| 2011/0036850 | A1 | 2/2011 | Sugai et al. |
| 2012/0065327 | A1* | 3/2012 | Ogawa .................. C08G 69/28 528/336 |
| 2014/0127433 | A1 | 5/2014 | Arakawa et al. |
| 2019/0010328 | A1 | 1/2019 | Oda et al. |
| 2019/0070072 | A1 | 3/2019 | Arakawa et al. |
| 2020/0048441 | A1 | 2/2020 | Kato et al. |
| 2020/0079959 | A1 | 3/2020 | Sato et al. |

FOREIGN PATENT DOCUMENTS

| | | | |
|---|---|---|---|
| CN | 102026880 | A | 4/2011 |
| EP | 2261124 | A1 | 12/2010 |
| JP | S60-232952 | A | 11/1985 |
| JP | S63-267549 | A | 11/1988 |
| JP | 06287298 | A * | 10/1994 |
| JP | H07-223305 | A | 8/1995 |
| JP | 2006-111718 | A | 4/2006 |
| JP | 2008-531827 | A | 8/2008 |
| JP | 2009-035286 | A | 2/2009 |
| JP | 2016-169027 | A | 9/2016 |
| TW | 200514825 | A | 5/2005 |
| TW | 201741141 | A | 12/2017 |
| WO | 2005/012430 | A1 | 2/2005 |
| WO | 2008/146803 | A1 | 12/2008 |
| WO | 2013/002075 | A1 | 1/2013 |
| WO | 2017/115685 | A1 | 7/2017 |
| WO | 2017/141969 | A1 | 8/2017 |
| WO | 2018/070194 | A1 | 4/2018 |
| WO | 2018/180401 | A1 | 10/2018 |

OTHER PUBLICATIONS

Extended European Search Report issued in corresponding European Application No. 19793120.7 dated May 14, 2021 (7 pages).
International Preliminary Report on Patentability and Written Opinion for PCT/JP2019/017035, dated Jul. 30, 2019, and English Translation submitted herewith (12 pages).
International Search Report for PCT/JP2019/017035, dated Jul. 30, 2019, and English Translation submitted herewith (5 pages).
CNIPA; Application No. 201980027765.5; Office Action dated Feb. 16, 2022, 7 pages.
International Preliminary Report on Patentability and Written Opinion for PCT/JP2019/017036, dated Jul. 30, 2019, and English Translation submitted herewith, 11 pages.
International Search Report for PCT/JP2019/017036, dated Jul. 30, 2019, and English Translation submitted herewith , 5 pages.
EPO; Application No. 19793120.7; Office Action dated Dec. 6, 2022, 5 pages.

* cited by examiner

US 12,017,433 B2

MULTILAYERED ARTICLE AND MULTILAYERED CONTAINER

CROSS-REFERENCE TO RELATED APPLICATIONS

This application is a U.S. national phase application filed under 35 U.S.C. § 371 of International Application Number PCT/JP2019/017035, filed Apr. 22, 2019, designating the United States, which claims priority from Japanese Application Number 2018-082856, filed Apr. 24, 2018.

FIELD OF THE INVENTION

The present invention relates to a multilayered article and a multilayered container.

BACKGROUND OF THE INVENTION

Multilayered articles and multilayered containers that use a polyester resin as a resin constituting an outer layer and an inner layer, and have a barrier layer formed from a polyamide resin between the outer layer and the inner layer have been examined in the past (Patent Documents 1 to 3).

CITATION LIST

Patent Documents

Patent Document 1: JP 2016-169027 A
Patent Document 2: JP 60-232952 A
Patent Document 3: JP 2006-111718 A

SUMMARY OF INVENTION

However, when such multilayered articles and multilayered containers having an outer layer and an inner layer formed from a polyester resin, and a barrier layer (intermediate layer) formed from a polyamide resin were examined by the present inventors, it was found that the oxygen barrier property is inferior depending on the type of polyamide resin.

The present inventors also found that when a polyamide resin constituted of meta-xylylenediamine and adipic acid is used as the polyamide resin, a multilayered article and a multilayered container with excellent oxygen barrier properties can be obtained, but the outer layer or inner layer formed from a polyester resin, and the barrier layer may delaminate in some cases due to impact from the outside or the like.

Thus, an object of the present invention is to solve the problems described above by providing a multilayered article and a multilayered container excelling in delamination resistance while maintaining excellent oxygen barrier properties.

As a result of examinations conducted by the present inventors with focus on the above-mentioned problems, the present inventors discovered that the above-mentioned problems can be solved by using, in the barrier layer, a combination of a polyamide resin, in which 70 mol % or more of the structural unit derived from a diamine is derived from xylylenediamine and over 90 mol % of the structural unit derived from a dicarboxylic acid is derived from adipic acid, and a polyamide resin, in which 70 mol % or more of the structural unit derived from a diamine is derived from xylylenediamine, and of the structural unit derived from dicarboxylic acid, from 30 to 65 mol % is derived from an α,ω-linear aliphatic dicarboxylic acid having from 4 to 20 carbons and from 70 to 35 mol % is derived from isophthalic acid. Specifically, the problems described above are solved by the following means <1>, and preferably by the following means <2> to <11>.

<1> A multilayered article having a layer containing a polyester resin as a main component, and a layer containing a polyamide resin as a main component, wherein the polyamide resin included in the layer containing a polyamide resin as a main component includes from 90 to 10 parts by mass of a polyamide resin (B) per from 10 to 90 parts by mass of a polyamide resin (A); the polyamide resin (A) includes from a structural unit derived from a diamine and a structural unit derived from a dicarboxylic acid, 70 mol % or more of the structural unit derived from a diamine being derived from xylylenediamine, and more than 90 mol % of the structural unit derived from a dicarboxylic acid being derived from adipic acid; and the polyamide resin (B) includes a structural unit derived from a diamine and a structural unit derived from a dicarboxylic acid, 70 mol % or more of the structural unit derived from a diamine being derived from xylylenediamine, and of the structural unit derived from a dicarboxylic acid, from 30 to 65 mol % is derived from an α,ω-linear aliphatic dicarboxylic acid having from 4 to 20 carbons, and from 70 to 35 mol % is derived from isophthalic acid, a total of which does not exceed 100 mol %.

<2> The multilayered article according to <1>, wherein at least 70 mol % of the structural unit derived from a diamine in the polyamide resin (A) is derived from meta-xylylenediamine.

<3> The multilayered article according to <1> or <2>, wherein at least 70 mol % of the structural unit derived from a diamine in the polyamide resin (B) is derived from meta-xylylenediamine.

<4> The multilayered article according to any one of <1> to <3>, wherein from 30 to 65 mol % of the structural unit derived from a dicarboxylic acid in the polyamide resin (B) is derived from adipic acid.

<5> The multilayered article according to <1>, wherein the polyamide resin included in the layer containing a polyamide resin as a main component includes from 80 to 20 parts by mass of the polyamide resin (B) per 20 to 80 parts by mass of the polyamide resin (A); 90 mol % or more of the structural unit derived from a diamine in the polyamide resin (A) is derived from meta-xylylenediamine; 90 mol % or more of the structural unit derived from a diamine in the polyamide resin (B) is derived from meta-xylylenediamine; and of the structural unit derived from a dicarboxylic acid in the polyamide resin (B), from 30 to 65 mol % is derived from adipic acid, and from 70 to 35 mol % is derived from isophthalic acid.

<6> The multilayered article according to any one of <1> to <5>, wherein, of the structural unit derived from a dicarboxylic acid in the polyamide resin (B), from 30 to 59 mol % is derived from adipic acid, and from 70 to 41 mol % is derived from isophthalic acid.

<7> The multilayered article according to any of <1> to <6>, wherein the polyamide resin (B) is an amorphous polyamide resin.

<8> The multilayered article according to any one of <1> to <7>, further including a layer containing a second polyester resin as a main component, the multilayered article including the layers positioned in an order of the layer containing a polyester resin as a main component, the layer containing a polyamide resin as a main component, and the layer containing a second polyester resin as a main component.

<9> The multilayered article according to any one of <1> to <8>, wherein the multilayered article is stretched.

<10> A multilayered container containing the multilayered article as in any one of <1> to <9>.

<11> The multilayered container according to <10>, wherein the container is a bottle.

According to the present invention, a multilayered article and a multilayered container that excel in delamination resistance while maintaining an excellent oxygen barrier property can be provided.

DESCRIPTION OF EMBODIMENTS

The contents of the present invention will be described in detail below. Note that, in the present specification, "from . . . to . . . " is used to mean that the given numerical values are included as the lower limit value and the upper limit value, respectively.

In the present invention, the term amorphous resin means a resin that does not have a definite melting point, and more specifically, means a resin having a crystal melting enthalpy ΔHm of less than 5 J/g, preferably 3 J/g or less, and more preferably 1 J/g or less. The crystal melting enthalpy is measured in accordance with a method described in the examples below.

The multilayered article of the present invention includes: a layer containing a polyester resin as a main component (hereinafter, a "polyester resin layer"), and a layer containing a polyamide resin as a main component (hereinafter, a "barrier layer"), the multilayered article being characterized in that the polyamide resin included in the layer containing a polyamide resin as a main component includes from 90 to 10 parts by mass of a polyamide resin (B) per 10 to 90 parts by mass of a polyamide resin (A); the polyamide resin (A) includes a structural unit derived from a diamine and a structural unit derived from a dicarboxylic acid, 70 mol % or more of the structural unit derived from a diamine is derived from xylylenediamine, and more than 90 mol % of the structural unit derived from a dicarboxylic acid is derived from adipic acid; and the polyamide resin (B) includes a structural unit derived from a diamine and a structural unit derived from a dicarboxylic acid, 70 mol % or more of the structural unit derived from a diamine is derived from xylylenediamine, and of the structural unit derived from a dicarboxylic acid, from 30 to 65 mol % is derived from an α,ω-linear aliphatic dicarboxylic acid having from 4 to 20 carbons, and from 70 to 35 mol % is derived from isophthalic acid, a total of which does not exceed 100 mol %. Such a configuration can provide a multilayered article and a multilayered container excelling in delamination resistance while maintaining an excellent oxygen barrier property. That is, it is known that the layer formed from the polyamide resin (A) has an excellent oxygen barrier property, but delamination with the polyester resin layer may occur, and the delamination resistance has not been sufficient. To improve this delamination resistance, it is conceivable to blend polyamide 6I/6T or the like in addition to the polyamide resin (A) in the barrier layer. However, a barrier layer in which polyamide 6I/6T is blended in addition to the polyamide resin (A) exhibits a poor oxygen barrier property. Accordingly, as a result of various examinations, the present inventors succeeded in providing a multilayered article that excels in delamination resistance while maintaining excellent oxygen barrier resistance by blending the polyamide resin (B) with the polyamide resin (A).

Furthermore, the multilayered article of the present invention can also excel in appearance.

Moreover, when the multilayered article of the present invention is a multilayered container, even when the multilayered container is filled with contents having a relatively high temperature of 60° C. or higher, an appearance change or a change in fully filled volume of the multilayered container can also be suppressed while maintaining the performance described above.

The present invention will be described in detail below.
Layer Containing Polyester Resin as a Main Component (Polyester Resin Layer)

The polyester resin layer contains a polyester resin as a main component. Here, the term "main component" means that the polyester resin is the component with the largest content amount amongst components contained in the polyester resin layer. The amount of polyester resin contained in the polyester resin layer is preferably 80 mass % or more, more preferably 90 mass % or more, even more preferably 95 mass % or more, and yet even more preferably 98 mass % or more.

The inherent viscosity of the polyester resin is preferably from 0.50 to 0.90 dL/g. One type of polyester resin may be contained alone, or two or more types of polyester resins may be contained. In a case where two or more types thereof are contained therein, the total amount is preferably within the range described above.

Polyester resins including both a first embodiment and a second embodiment described below are also given as examples of embodiments of the present invention.

The first embodiment of the polyester resin included in the polyester resin layer is a polyester resin having a melting point.

The melting point of the polyester resin in the polyester resin of the first embodiment is preferably from 100 to 300° C., more preferably from 200 to 300° C., and even more preferably from 220 to 295° C. The melting point is measured in accordance with a method described in the examples below. The same applies to the melting points below.

The polyester resin of the first embodiment has a glass transition temperature of preferably less than 90° C., more preferably 85° C. or lower, and even more preferably 80° C. or lower. The lower limit of the glass transition temperature is preferably 60° C. or higher, more preferably 65° C. or higher, and even more preferably 70° C. or higher. The use of such a polyester resin tends to provide more excellent molding processability. The glass transition temperature is measured in accordance with a method described in the examples below. The same applies to the glass transition temperatures described below.

Such a polyester resin is a polyester resin constituted by a structural unit derived from a dicarboxylic acid and a structural unit derived from a diol, in which at least 80 mol % (preferably 85 mol % or more, more preferably 90 mol % or more, and even more preferably 95 mol % or more) of the structural unit derived from a dicarboxylic acid is derived from at least one type selected from terephthalic acid and esters thereof, and at least 80 mol % (preferably 85 mol % or more, more preferably 90 mol % or more, and even more preferably 95 mol % or more) of the structural unit derived from a diol is derived from ethylene glycol. Here, the polyester resin of the first embodiment is formed from a structural unit derived from a dicarboxylic acid and a structural unit derived from a diol, but may also include a structural unit besides the structural unit derived from a dicarboxylic acid and the structural unit derived from a diol, or other moieties such as terminal groups. Typically, 95 mass % or more, and preferably 98 mass % or more of the polyester resin used in the present invention is constituted by the structural unit derived from a dicarboxylic acid and the structural unit derived from a diol. The same applies to other polyester resins.

For details on the polyester resin that can be used in the first embodiment, the disclosure of paragraphs [0064] to [0080] of JP 2016-169027 A, the contents of which are incorporated herein, can be referenced.

The second embodiment of the polyester resin included in the polyester resin layer is an amorphous polyester resin. A multilayered article with excellent transparency is obtained by using an amorphous resin.

The glass transition temperature of the amorphous polyester resin is preferably 90° C. or higher, and more preferably 100° C. or higher. The upper limit of the glass transition temperature is preferably 155° C. or lower, and more preferably 150° C. or lower. A multilayered article with more superior heat resistance is obtained by using such a polyester resin.

One example of the amorphous polyester resin is a polyester resin constituted by a structural unit derived from a dicarboxylic acid and a structural unit derived from a diol, in which at least 80 mol % (preferably at least 85 mol %, more preferably at least 90 mol %, and even more preferably at least 95 mol %) of the structural unit derived from a dicarboxylic acid is derived from at least one type selected from terephthalic acid, naphthalene dicarboxylic acid, and esters thereof, and of the structural unit derived from a diol, from 5 to 60 mol % (preferably from 15 to 60 mol %) is derived from spiroglycol and from 95 to 40 mol % (preferably from 85 to 40 mol %) is derived from ethylene glycol.

Another example of the amorphous polyester resin is a polyester resin constituted by a structural unit derived from a dicarboxylic acid and a structural unit derived from a diol, in which at least 80 mol % (preferably at least 85 mol %, more preferably at least 90 mol %, and even more preferably at least 95 mol %) of the structural unit derived from a dicarboxylic acid is derived from at least one type selected from terephthalic acid, naphthalene dicarboxylic acid, and esters thereof, and of the structural unit derived from a diol, from 90 to 10 mol % (preferably from 85 to 40 mol %) is derived from 1,4-cyclohexanedimethanol, and from 10 to 90 mol % (preferably from 15 to 60 mol %) is derived from ethylene glycol.

As the polyester resin used in the second embodiment, the polyester resins described in paragraphs [0010] to [0021] of JP 2006-111718 A, the polyester resins described in JP 2017-105873 A, and the polyester resins described in WO 2013/168804 can be referenced, and the contents of the disclosures thereof are incorporated herein.

The polyester resin layer of the present invention may contain other components within a range that does not depart from the spirit of the present invention. Specifically, various additives can be added such as antioxidants, optical stabilizers, UV absorbers, plasticizers, bulking agents, matting agents, dryness adjusting agents, antistatic agents, anti-settling agents, surfactants, flow modifiers, drying oils, waxes, colorants, reinforcing agents, surface smoothing agents, leveling agents, curing reaction accelerators, and thickening agents. For details on the other components, refer to the disclosure in paragraph [0026] of JP 2006-111718 A, the contents of which are incorporated in the present specification.

Layer Containing Polyamide Resin as a Main Component (Barrier Layer)

The polyamide resin contained in the layer containing the polyamide resin as a main component includes from 90 to 10 parts by mass of the polyamide resin (B) per 10 to 90 parts by mass of polyamide resin (A), more preferably includes from 80 to 20 parts by mass of the polyamide resin (B) per 20 to 80 parts by mass of the polyamide resin (A), and even more preferably includes from 75 to 25 parts by mass of the polyamide resin (B) per 25 to 75 parts by mass of the polyamide resin (A). However, the total amount does not exceed 100 parts by mass.

Here, the term "main component" means that the polyamide resin is the component with the largest content amount amongst components contained in the barrier layer. The amount of the polyamide resin contained in the barrier layer is preferably 80 mass % or more, more preferably 90 mass % or more, even more preferably 95 mass % or more, and yet even more preferably 98 mass % or more.

A single type of the polyamide resin (A) and a single type of the polyamide resin (B) may be included, or two or more types of each may be included. In a case where two or more types thereof are contained therein, the total amount is preferably within the range described above.

Furthermore, when the barrier layer includes two or more types of polyamide resins (A) and/or polyamide resins (B), the polyamide resin (A) and/or the polyamide resin (B) of the largest content amount need only satisfy at least the below-described characteristics such as the glass transition temperature, and preferably, 90 mass % or more of the polyamide resin (A) and/or the polyamide resin (B) satisfies the characteristics thereof.

Note that the polyamide resin contained in the layer containing the polyamide resin as a main component may include a polyamide resin other than the polyamide resin (A) and the polyamide resin (B) at a proportion of 5 mass % or less of the total of the polyamide resin (A) and the polyamide resin (B), and preferably at a proportion from 0 to 3 mass %, and more preferably from 0 to 1 mass %.

Polyamide Resin (A)

The polyamide resin (A) used in the present invention is constituted by a structural unit derived from a diamine and a structural unit derived from a dicarboxylic acid, and 70 mol % or more of the structural unit derived from a diamine is derived from xylylenediamine, and more than 90 mol % of the structural unit derived from a dicarboxylic acid is derived from adipic acid. A multilayered article better excelling in the gas barrier property is obtained by adopting such as configuration.

In the polyamide resin (A), preferably 80 mol % or more, more preferably 90 mol % or more, even more preferably 95 mol % or more, and yet even more preferably 99 mol % or more of the structural unit derived from a diamine is derived from xylylenediamine. The xylylenediamine is preferably meta-xylylenediamine and para-xylylenediamine, and is more preferably meta-xylylenediamine. An example of a preferred embodiment of the polyamide resin (A) of the present invention is a polyamide resin in which at least 70 mol % of the structural unit derived from a diamine is derived from meta-xylylenediamine.

Examples of diamines besides xylylenediamine that can be used as raw material diamine components of the polyamide resin (A) include aliphatic diamines such as tetramethylenediamine, pentamethylenediamine, 2-methylpentanediamine, hexamethylenediamine, heptamethylenediamine, octamethylenediamine, nonamethylenediamine, decamethylenediamine, dodecamethylenediamine, 2,2,4-trimethylhexamethylenediamine, and 2,4,4-trimethylhexamethylenediamine; alicyclic diamines such as 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, bis(aminomethyl)decalin, and bis(aminomethyl)tricyclodecane; and diamines having aromatic ring(s), such as bis(4-aminophenyl)ether, p-phenylenediamine, and bis(aminomethyl)naphthalene. One type thereof can be used, or two or more types can be mixed and used.

In a case where a diamine other than xylylenediamine is used as the diamine component, the diamine thereof is used at a proportion of preferably 30 mol % or less, more preferably from 1 to 25 mol %, and particularly preferably from 5 to 20 mol %, of the structural unit derived from a diamine.

In the polyamide resin (A), preferably, not less than 95 mol %, and more preferably not less than 99 mol %, of the structural unit derived from a dicarboxylic acid is derived from adipic acid.

Examples of dicarboxylic acids besides adipic acid preferably used as a raw material dicarboxylic acid component in the polyamide resin (A) include aliphatic dicarboxylic acids such as succinic acid, glutaric acid, pimelic acid, suberic acid, azelaic acid, sebacic acid, undecanedioic acid, and dodecanedioic acid; phthalic acid compounds such as isophthalic acid, terephthalic acid, and orthophthalic acid; and naphthalene dicarboxylic acids, such as 1,2-naphthalene dicarboxylic acid, 1,3-naphthalene dicarboxylic acid, 1,4-naphthalene dicarboxylic acid, 1,5-naphthalene dicarboxylic acid, 1,6-naphthalene dicarboxylic acid, 1,7-naphthalene dicarboxylic acid, 1,8-naphthalene dicarboxylic acid, 2,3-naphthalene dicarboxylic acid, 2,6-naphthalene dicarboxylic acid, and 2,7-naphthalene dicarboxylic acid. One type thereof can be used, or two or more types can be mixed and used.

In a case where a dicarboxylic acid other than adipic acid is used as the dicarboxylic acid component, the dicarboxylic acid thereof is used at a proportion of preferably less than 10 mol %, more preferably from 1 to 8 mol %, and particularly preferably from 1 to 5 mol %, of the structural unit derived from a dicarboxylic acid.

Note that the polyamide resin (A) is constituted by a structural unit derived from a diamine and a structural unit derived from a dicarboxylic acid as main components, but does not entirely exclude components other than these, and of course, the polyamide resin may contain a structural unit derived from a lactam such as ε-caprolactam or laurolactam, or from an aliphatic aminocarboxylic acid such as aminocaproic acid and aminoundecanoic acid. Here, "main components" indicates that of the structural unit constituting the polyamide resin (A), the total of the structural unit derived from a diamine and the structural unit derived from a dicarboxylic acid is the largest of all structural unit. In the present invention, the total of the structural unit derived from a diamine and structural unit derived from a carboxylic acid in the polyamide resin (A) preferably accounts for 90% or more, more preferably 95% or more, and even more preferably 98% or more, of the total structural unit.

The number average molecular weight (Mn) of the polyamide resin (A) is preferably 10000 or higher, and more preferably 15000 or higher. The upper limit of the number average molecular weight of the polyamide resin (A) is not particularly established, but may be, for example, 100000 or less, 50000 or less, or even 40000 or less. The number average molecular weight in the present invention is measured in accordance with a method described in paragraph [0016] of WO 2017/090556, the contents of which are incorporated herein.

The polyamide resin (A) is normally a crystalline resin, and the melting point thereof is preferably from 190 to 300° C., more preferably from 200 to 270° C., and even more preferably from 210 to 250° C.

The glass transition temperature of the polyamide resin (A) is preferably from 75° C. to 95° C.

The polyamide resin (A) used in the present invention preferably includes phosphorus atoms at a proportion from 3 to 300 ppm by mass, more preferably from 4 to 250 ppm by mass, and even more preferably from 5 to 200 ppm by mass. Such a configuration tends to provide more excellent moldability.

Polyamide Resin (B)

The polyamide resin (B) is constituted from a structural unit derived from a diamine and a structural unit derived from a dicarboxylic acid, and at least 70 mol % of the structural unit derived from a diamine is derived from xylylenediamine, and of the structural unit derived from a dicarboxylic acid, from 30 to 65 mol % is derived from α,ω-linear aliphatic dicarboxylic acid having from 4 to 20 carbons, and from 70 to 35 mol % is derived from isophthalic acid (provided that the total does not exceed 100 mol %). By compounding such a polyamide resin, the transparency and oxygen barrier properties can be further improved. The polyamide resin (B) used in the present invention is typically an amorphous polyamide resin. By using an amorphous polyamide resin, transparency of the multilayered article can be further improved.

In the polyamide resin (B), 70 mol % or more, preferably 80 mol % or more, more preferably 90 mol % or more, even more preferably 95 mol % or more, and yet even more preferably 99 mol % or more of the structural unit derived from a diamine is derived from xylylenediamine. The xylylenediamine is preferably meta-xylylenediamine and para-xylylenediamine, and is more preferably meta-xylylenediamine.

An example of a preferred embodiment of the polyamide resin (B) of the present invention is a polyamide resin in which at least 70 mol % of the structural unit derived from a diamine is derived from meta-xylylenediamine.

Examples of the diamine other than xylylenediamine include aromatic diamines such as para-phenylenediamine, and aliphatic diamines, such as 1,3-bis(aminomethyl)cyclohexane, 1,4-bis(aminomethyl)cyclohexane, tetramethylene diamine, pentamethylene diamine, hexamethylene diamine, octamethylene diamine, and nonamethylene diamine. A single type of these other diamines may be used, or two or more types thereof may be used.

In a case where a diamine other than xylylenediamine is used as the diamine component, the diamine thereof is used at a proportion of preferably 30 mol % or less, more preferably from 1 to 25 mol %, and particularly preferably from 5 to 20 mol %, of the structural unit derived from a diamine.

In the present invention, as described above, of the structural unit derived from a dicarboxylic acid in the polyamide resin (B), from 30 to 65 mol % is derived from an α,ω-linear aliphatic dicarboxylic acid having from 4 to 20 carbons (preferably, an α,ω-linear aliphatic dicarboxylic acid having from 4 to 8 carbons, and more preferably adipic acid), and from 70 to 35 mol % is derived from isophthalic acid.

Of the total dicarboxylic acids constituting the structural unit derived from a dicarboxylic acid in the polyamide resin (B), a lower limit of the proportion of isophthalic acid is not less than 35 mol %, preferably not less than 40 mol %, and more preferably not less than 41 mol %. The upper limit of the proportion of the isophthalic acid is not more than 70 mol %, preferably not more than 67 mol %, more preferably not more than 65 mol %, even more preferably not more than 62 mol %, and yet even more preferably not more than 60 mol %, and may be not more than 58 mol %. Setting the proportion of the isophthalic acid to such a range tends to further improve the oxygen barrier property of the multilayered article of the present invention.

Among the total dicarboxylic acids constituting the structural unit derived from a dicarboxylic acid in the polyamide resin (B), the lower limit of the ratio of α,ω-linear aliphatic dicarboxylic acid having from 4 to 20 carbons (preferably, α,ω-linear aliphatic dicarboxylic acid having from 4 to 8 carbons, and more preferably adipic acid) is not less than 30 mol %, preferably not less than 33 mol %, more preferably not less than 35 mol %, even more preferably not less than 38 mol %, and yet even more preferably not less than 40 mol %, and may even be not less than 42 mol %. The upper limit of the proportion of the α,ω-linear aliphatic dicarboxylic acid having from 4 to 20 carbons is not more than 65 mol %, preferably not more than 60 mol %, and more preferably not more than 59 mol %. Setting the proportion of the isophthalic acid to such a range tends to further improve the oxygen barrier property of the multilayered article of the present invention.

As described above, the α,ω-linear aliphatic dicarboxylic acid having from 4 to 20 carbons is preferably an α,ω-linear aliphatic dicarboxylic acid having from 4 to 8 carbons.

Examples of the α,ω-linear aliphatic dicarboxylic acid having from 4 to 20 carbons that is preferably used as the raw material dicarboxylic acid component of the polyamide resin include aliphatic dicarboxylic acids, such as succinic acid, glutaric acid, pimelic acid, suberic acid, azelaic acid, adipic acid, sebacic acid, undecanedioic acid, and dodecanedioic acid. A single type thereof can be used, or two or more types thereof can be mixed and used. Among these, adipic acid is preferable because the melting point of the polyamide resin is within an appropriate range for molding.

Among the total dicarboxylic acids constituting the structural unit derived from a dicarboxylic acid in the polyamide resin (B), the total proportion of isophthalic acid and the α,ω-linear aliphatic dicarboxylic acid having from 4 to 20 carbons is preferably not less than 90 mol %, more preferably not less than 95 mol %, and even more preferably not less than 98 mol %, and may be 100 mol %. Setting the total proportion of isophthalic acid and the α,ω-linear aliphatic dicarboxylic acid having from 4 to 20 carbons to such a proportion tends to further improve the transparency of the multilayered article of the present invention.

Examples of dicarboxylic acids besides isophthalic acid and the α,ω-linear aliphatic dicarboxylic acid having from 4 to 20 carbons include phthalic acid compounds, such as terephthalic acid and orthophthalic acid; and naphthalene dicarboxylic acids such as isomers of 1,2-naphthalene dicarboxylic acid, 1,3-naphthalene dicarboxylic acid, 1,4-naphthalene dicarboxylic acid, 1,5-naphthalene dicarboxylic acid, 1,6-naphthalene dicarboxylic acid, 1,7-naphthalene dicarboxylic acid, 1,8-naphthalene dicarboxylic acid, 2,3-naphthalene dicarboxylic acid, 2,6-naphthalene dicarboxylic acid, and 2,7-naphthalene dicarboxylic acid. One type thereof can be used, or two or more types can be mixed and used.

The polyamide resin (B) is preferably substantially free of structural unit derived from terephthalic acid. Substantially free means 5 mol % or less, preferably 3 mol % or less, and even more preferably 1 mol % or less, of the molar amount of isophthalic acid contained in the polyamide resin (B). With such a configuration, suitable moldability is maintained, and the gas barrier property is less likely to change due to humidity.

Note that the polyamide resin (B) of the present invention is formed from a structural unit derived from a dicarboxylic acid and a structural unit derived from a diamine, but may also include a structural unit besides the structural unit derived from a dicarboxylic acid and the structural unit derived from a diamine, or other moieties such as terminal groups. Examples of other structural units include, but are not limited to, a structural unit derived from lactams, such as ε-caprolactam, valerolactam, laurolactam, and undecalactam, and aminocarboxylic acids, such as 11-aminoundecanoic acid and 12-aminododecanoic acid, and the like. Furthermore, the polyamide resin (B) used in the present invention may include trace amounts of components such as additives used for synthesis. Typically, 95 mass % or more, and preferably 98 mass % or more of the polyamide resin (B) used in the present invention is a structural unit derived from a dicarboxylic acid or a structural unit derived from a diamine.

The number average molecular weight (Mn) of the polyamide resin (B) is preferably 8000 or more, and more preferably 10000 or more. The upper limit of the number average molecular weight of the polyamide resin (B) is not particularly established, but may be, for example, not more than 50000, not more than 30000, or not more than 20000. An example of an embodiment of the present invention is an aspect in which the Mn of the polyamide resin (B) is smaller than the Mn of the polyamide resin (A). More preferably, the Mn of the polyamide resin (B) is smaller than the Mn of the polyamide resin (A) by 5000 or more, more preferably smaller by 8000 or more, and even more preferably smaller by 10000 or more. An example of the upper limit of a difference between the Mn of the polyamide resin (B) and the Mn of the polyamide resin (A) is 25000 or less. With such a configuration, the dispersibility and miscibility of the polyamide resin (A) and the polyamide resin (B) becomes favorable, and the transparency and gas barrier properties tend to become more superior.

The glass transition temperature of the polyamide resin (B) is preferably higher than 90° C. but not higher than 150° C., more preferably from 95 to 145° C., even more preferably from 101 to 140° C., and yet even more preferably from 120 to 135° C. Such a configuration tends to further improve the delamination resistance of a multilayered container.

The polyamide resin (B) used in the present invention preferably contains phosphorus atoms at a proportion from 3 to 300 ppm by mass, more preferably from 4 to 250 ppm by mass, even more preferably from 5 to 200 ppm by mass, yet even more preferably from 20 to 100 ppm by mass, and still more preferably from 20 to 50 ppm by mass.

Other Components

The barrier layer of the present invention may contain additives within a range that does not impair the purpose of the present invention, including: inorganic fillers such as glass fibers and carbon fibers; plate-shaped inorganic fillers such as glass flakes, talc, kaolin, mica, montmorillonite, and organo-modified clay; impact resistance modifiers such as various elastomers; crystal nucleating agents; lubricants such as fatty acid amide-based lubricants and fatty acid amide type compounds; antioxidants such as copper compounds, organic or inorganic halogen-based compounds, hindered phenol-based compounds, hindered amine-based compounds, hydrazine-based compounds, sulfur-based compounds, and phosphorus-based compounds; coloring inhibitors; UV absorbers such as benzotriazole-based UV absorbers; additives such as mold release agents, plasticizers, colorants, and flame retardants; and compounds containing oxidation reaction accelerators, benzoquinones, anthraquinones, and naphthoquinones.

Oxidation Reaction Accelerator

The barrier layer (barrier resin composition) in the present invention may contain an oxidation reaction accelerator. By including an oxidation reaction accelerator, the gas barrier property of the multilayered article can be further enhanced.

The oxidation reaction accelerator may be any compound that exhibits an oxidation reaction promoting effect, but from the perspective of promoting an oxidation reaction of the polyamide resin, a compound containing a transition metal element is preferable. The transition metal element is preferably at least one selected from, of the periodic table of elements, Group VIII transition metals, manganese, copper, and zinc, and from the perspective of effectively expressing an oxygen absorption capacity, the transition metal element is more preferably at least one selected from cobalt, iron, manganese, and nickel, and is even more preferably cobalt.

In addition to use of the abovementioned metal alone, an oxidation reaction accelerator that is in the form of a low-valency oxide, an inorganic acid salt, an organic acid salt, or a complex salt containing the metals described above may be used as such an oxidation reaction accelerator. Examples of the inorganic acid salt include halides such as chlorides or bromides, and carbonates, sulfates, nitrates, phosphates, and silicates. Meanwhile, examples of the organic acid salt include carboxylates, sulfonates, and phosphonates. Moreover, transition metal complexes with β-diketones or β-keto acid esters can also be used.

In particular, in the present invention, from the perspective of favorably expressing an oxygen absorbing capacity, it is preferable to use at least one type selected from carboxylates, carbonates, acetylacetonate complexes, oxides, and halides, which contain the metal atoms described above. It is more preferable to use at least one selected from octanoates, neodecanoates, naphthenates, stearates, acetates, carbonates, and acetylacetonate complexes, and use of cobalt carboxylates such as cobalt octanoate, cobalt naphthenate, cobalt acetate, and cobalt stearate is more preferable.

The oxidation reaction accelerator described above functions not only to promote an oxidation reaction of the polyamide resin, but also as a catalyst for an oxidation reaction of an organic compound having an unsaturated carbon bond or a compound having a secondary or tertiary hydrogen in the molecule. Therefore, in order to further increase oxygen absorption capacity, various compounds in addition to the above-described oxidation reaction accelerator can also be blended in the barrier layer of the present invention. Examples include polymers of unsaturated hydrocarbons such as polybutadiene or polyisoprene, or oligomers thereof, compounds having xylylenediamine as a backbone, or compounds to which a functional group is added to enhance miscibility between the compound and a polyester.

Examples of oxidation reaction accelerators include the transition metal compounds described in paragraphs [0063] to [0066] and the oxidizable organic compounds described in paragraphs [0067] to [0072] of WO 2012/090797, the contents of which are incorporated herein.

When the oxidation reaction accelerator contains a transition metal element, the content thereof in terms of the transition metal concentration in the barrier layer is preferably from 10 to 1000 ppm by mass, more preferably from 20 to 500 ppm by mass, and even more preferably from 40 to 300 ppm by mass, from the perspective of promoting the oxidation reaction of the polyamide resin and increasing the oxygen absorption capacity of a molded product.

The transition metal concentration in the multilayered article can be measured using a known method such as, for example, ICP emission spectroscopy, ICP mass spectrometry, and fluorescent X-ray analysis.

One type of oxidation reaction accelerator may be used alone, or a combination of two or more types may be used. When two or more types are used in combination, the total amount is preferably within the range described above.

Embodiments of the Multilayered Article

A preferable embodiment of the multilayered article of the present invention is an aspect in which the barrier layer contains from 80 to 20 parts by mass of the polyamide resin (B) per 20 to 80 parts by mass of the polyamide resin (A), 90 mol % or more of structural unit derived from a diamine in the polyamide resin (A) is derived from meta-xylylenediamine, 90 mol % or more of structural unit derived from a diamine in the polyamide resin (B) is derived from meta-xylylenediamine, and of the structural unit derived from a dicarboxylic acid in the polyamide resin (B), from 30 to 65 mol % (preferably from 30 to 59 mol %, and more preferably from 40 to 59 mol %) is derived from adipic acid, and from 70 to 35 mol % (preferably from 70 to 41 mol %, and more preferably from 60 to 41 mol %) is derived from isophthalic acid.

Such a configuration tends to further improve the delamination resistance.

Layer Configuration

The multilayered article of the present invention is a multilayered article having at least one layer each of a layer containing a polyester resin as a main component (polyester resin layer) and a layer containing a polyamide resin as a main component (barrier layer). The polyester resin layer and the barrier layer are normally in contact.

The number of layers constituting the multilayered article is preferably at least three layers. In the present invention, an aspect including at least two layers of the polyester resin layer and at least one barrier layer is exemplified. In a preferable embodiment of the multilayered article of the present invention, the multilayered article further includes a layer containing a second polyester resin as a main component, and the layer containing a polyester resin as a main component, the layer containing a polyamide resin as a main component, and the layer containing a second polyester resin as a main component are positioned in this order.

More specifically, the number of layers constituting the multilayered article is more preferably from 3 to 10, and even more preferably from 3 to 5.

The number of polyester resin layers in the multilayered container is preferably from 1 to 5, and more preferably from 2 to 4. The number of barrier layers in the multilayered container is preferably from 1 to 3, and more preferably one layer or two layers.

For example, the multilayered container may be made from one polyester resin layer and one barrier layer and have a polyester resin layer/barrier layer configuration (with the polyester resin layer being an inner layer) or a barrier layer/polyester resin layer configuration (with the barrier layer being an inner layer), or may be a three layer configuration of a polyester resin layer/barrier layer/polyester resin layer made from two polyester resin layers and one barrier layer, or may be a five layer configuration of a polyester resin layer/barrier layer/polyester resin layer/barrier layer/polyester resin layer.

From the perspective of obtaining more superior delamination resistance, the barrier layer is preferably arranged at the center or at an inner side, and is more preferably arranged at an inner side. The matter of the "barrier layer is arranged at the center" means that in a cross section of the multilayered article in the thickness direction, the barrier layer is present near the center in the thickness direction. The matter of the "barrier layer is arranged at an inner side" means that in a cross section of the multilayered article in the thickness direction, the barrier layer is present at a position near the inner surface side in the thickness direction. As the position of the barrier layer of the present invention, an aspect in which the intermediate layer is the barrier layer is exemplified in JP 02-229023 A, the contents of which are incorporated herein.

In addition to the polyester resin layer and the barrier layer, the multilayered container of the present invention may also include an optional layer according to the desired performance and the like.

Stretching

The multilayered article of the present invention is preferably stretched. Examples of stretching include biaxial stretch blow molding that is performed when molding a container such as a bottle.

As a preferred embodiment of the stretching of the present invention, a preform (also referred to as a parison) containing a multilayered article of the present invention is biaxially stretched and blow molded. In particular, the stretching preferably includes a step of stretching using a stretch rod and high pressure air. The details of biaxial stretch blow molding will be described later.

Multilayered Container

In the present invention, a multilayered container containing the multilayered article of the present invention is exemplified. The shape of the multilayered container is not particularly limited, and may be, for example, a molded container such as a bottle, a cup, a tube, a tray, or a storage container, or may be a bag-shaped container such as a pouch, a standing pouch, or a zippered storage bag. In the present invention, the multilayered container is preferably a bottle.

Also, it is not necessary for all parts of the bottle to contain the multilayered article of the present invention, and particularly the barrier layer. For example, an aspect is exemplified in which the barrier layer is included in the body section of a bottle, but the barrier layer is not included in the vicinity of the opening (mouth plug section). However, the barrier layer is preferably present up to near the opening of the bottle because such a configuration provides even higher barrier performance.

From the perspective of content storage performance, the volume of the multilayered container of the present invention is preferably from 0.1 to 2.0 L, more preferably from 0.2 to 1.5 L, and even more preferably from 0.3 to 1.0 L. The thickness of the inner layer (polyester resin layer) of the multilayered container of the present invention is preferably not less than 0.01 mm, more preferably not less than 0.03 mm, and even more preferably not less than 0.05 mm, and preferably not more than 2.0 mm, more preferably not more than 1.5 mm, and even more preferably not more than 1.0 mm.

The thickness of the outer layer (polyester resin layer) is preferably not less than 0.01 mm, more preferably not less than 0.05 mm, and even more preferably not less than 0.05 mm, and is preferably not more than 2.0 mm, more preferably not more than 1.5 mm, and even more preferably not more than 1.0 mm.

The thickness of the barrier layer is preferably not less than 0.005 mm, more preferably not less than 0.01 mm, and even more preferably not less than 0.02 mm, and is preferably not more than 0.2 mm, more preferably not more than 0.15 mm, and even more preferably not more than 0.1 mm. When two or more barrier layers are provided, the total of the thicknesses of each barrier layer is preferably the thickness described above.

In addition, when two or more barrier layers are included and an intermediate layer is provided between a barrier layer and another barrier layer, the thickness of the intermediate layer is preferably not less than 0.01 mm, more preferably not less than 0.03 mm or more, and even more preferably not less than 0.05 mm, and is preferably not more than 2.0 mm, more preferably not more than 1.5 mm, and even more preferably not more than 1.0 mm.

The mass of the barrier layer in the multilayered container (in particular, a bottle) of the present invention is preferably from 1 to 20 mass %, more preferably from 2 to 15 mass %, and particularly preferably from 3 to 10 mass %, relative to the total mass of the multilayered container. By setting the mass of the barrier layer to within the range described above, a multilayered container exhibiting a good gas barrier property can be obtained, and molding into the multilayered container from a parison, which is a precursor of the multilayered container, is also facilitated.

The target content to be stored in the multilayered container of the present invention is not particularly limited, and examples include food products, cosmetics, pharmaceuticals, toiletries, mechanical, electrical and electronic components, oils, and resins, and the multilayered container of the present invention can be suitably used particularly as a container for storing food products.

Examples thereof include processed fishery products, processed livestock products, rice, and liquid foods. The multilayered container of the present invention is particularly suitable for storing foods that are easily affected by oxygen. For details thereof, refer to the descriptions in paragraphs [0032] to [0035] of JP 2011-37199 A, the contents of which are incorporated herein.

The food product to be filled into the multilayered container of the present invention is not particularly limited, but specific examples include beverages such as vegetable juice, fruit juice, teas, coffee and coffee beverages, milk and milk beverages, mineral water, ionic beverages, alcoholic beverages, fermented milk beverages, and soy milk; gel foods such as tofu, egg tofus, jellies, puddings, soft adzuki-bean jelly, mousse, yogurts, an apricot bean curd; seasonings such as sauces, soy sauce, ketchup, noodle soup bases, Japanese sauces, vinegar, mirin, dressings, jams, mayonnaise, miso, pickles, and grated spices, etc.; processed meat products such as salami, ham, sausage, yakitori, meatballs, hamburger, grilled pork, and beef jerky; processed fishery products such as kamaboko, shellfish, boiled fish, and tube-shaped fish paste cakes; processed rice products such as rice gruel, cooked rice, rice casserole, and red rice; sauces such as meat sauce, mabo sauce, pasta sauce, curry, stews, and hash sauce; dairy products such as cheese, butter, cream, and condensed milk; processed egg products such as boiled eggs and soft boiled eggs; boiled vegetables and boiled beans; side dishes such as fried foods, steamed foods, stir fry, boiled foods, and baked foods; Japanese pickled vegetables; noodles and pastas such as udon, soba, and spaghetti; and pickled fruit syrups.

Depending on the target content to be stored, the multilayered container may be disinfected or sterilized using ultraviolet rays, electron beams, gamma rays, X-rays, and the like.

Multilayered Article Manufacturing Method

The method for manufacturing the multilayered article of the present invention is not particularly specified, and a well-known method for manufacturing a multilayered article can be adopted.

When the multilayered article is to be manufactured, it is preferable to prepare a polyester resin composition to configure the polyester resin layer and a barrier resin composition to configure the barrier layer (hereinafter, these are collectively referred to as "resin compositions"). The barrier resin composition uses at least two types of polyamide resins including a polyamide resin (A) and polyamide resin (B), but the method for blending the polyamide resin (A) and the polyamide resin (B) is not particularly limited, and the resin compositions may be dry-blended and supplied when fabricating a preform for a bottle, or may be melt blended using a single screw extruder, a twin screw extruder, or the like prior to fabricating the preform, or a master batch may be prepared for use by melt blending a portion of the resins. The same applies to a case in which the polyester resin composition contains two or more resins.

Furthermore, when compounding an oxidation reaction accelerator in the barrier layer, the accelerator may be dry blended together with the polyamide resin, or may be formed in a master batch with a portion of the polyamide resin, and then blended, or may be melt-blended.

An appropriate method for manufacturing the multilayered article is selected with consideration of the structure and the like of the molded product containing the multilayered article.

For example, when molding a film or sheet, a resin composition that has been melted through a T die, a circular die, or the like can be extruded from an extruder to manufacture the film or sheet. The obtained film can also be stretched and processed into a stretched film.

Moreover, a bottle shaped package container can be obtained by injecting a molten resin composition into a mold from an injection molding machine to manufacture a preform, and then subjecting the preform to blow stretching (injection blow molding, injection stretch blow molding). Alternatively, a bottle shaped package container can be obtained by blowing, in a mold, a parison obtained by extruding a molten resin composition into the mold from an extruder (direct blow molding).

A container such as a tray or a cup can be molded and obtained by a method of injecting a molten resin composition into a mold from an injection molding machine, or by a molding method such as vacuum molding or pressure molding a sheet.

The multilayered container of the present invention is preferably manufactured by subjecting a preform to biaxial stretch blow molding. The multilayered container of the present invention may be cold parison molded or hot parison molded.

Cold parison molding (two-stage molding) is a molding process in which an injection molded preform is cooled to room temperature and stored, and then reheated with another device and supplied to blow molding. Hot parison molding (one stage molding) is a method of blow molding a parison by preheating at the time of injection molding and adjusting the temperature prior to blowing without completely cooling the parison to room temperature. In hot parison molding, in many cases, an injection molding machine, a temperature control zone, and a blow molding machine are provided in the same molding machine unit, and preform injection molding and blow molding are performed.

Figure 1:
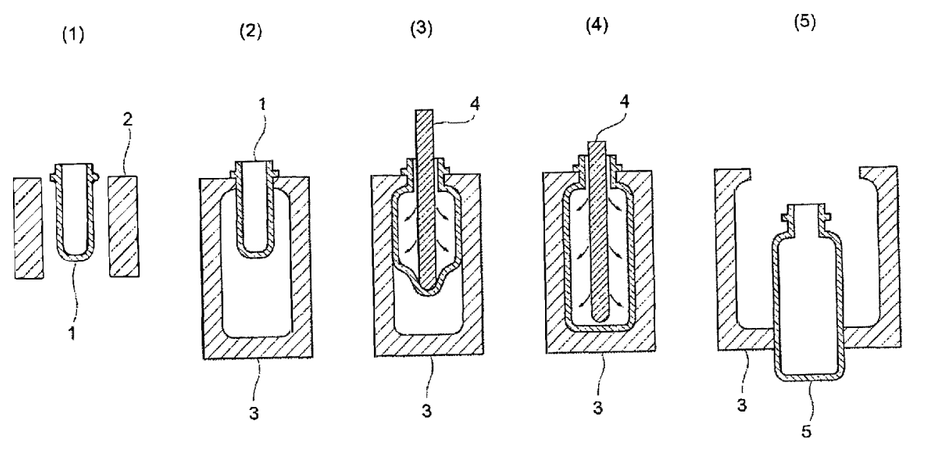
FIG. 1 is a schematic view illustrating a method of manufacturing a multilayered container through cold parison molding.

A first embodiment of the method for manufacturing a multilayered container of the present invention is an aspect of molding through cold parison molding. The first embodiment of the manufacturing method is described below in accordance with FIG. 1. Of course, the first embodiment is not limited to the configuration depicted in FIG. 1. In FIG. 1, first, a preform 1 is heated ((1) of FIG. 1). Heating is performed using an infrared heater 2 or the like.

Next, the heated preform is biaxially stretched and blow molded. Namely, the preform is placed in a mold 3 ((2) of FIG. 1) and blow molded while being stretched by a stretching rod 4 ((3) and (4) of FIG. 1). Stretching is, for example, a method in which the surface of a preform is heated, after which the preform is stretched axially by a mechanical means such as pressing with a core rod insert, and next, the stretched preform is stretched and blow molded in a transverse direction by blowing with high pressure air of normally from 2 to 4 MPa. Furthermore, in order to improve the heat resistance of the container, stretching may be combined with a blow molding method that increases the crystallinity or reduces residual strain. For example, a method (single blow molding) exists in which the surface of a multilayer preform is heated, after which the preform is blow molded inside a mold of a temperature equal to or higher than the glass transition point. Furthermore, the blow molding method may also be a so-called double blow molding method that includes a primary blow molding step in which the preform is biaxially stretched and blow molded to larger than the final shape, a step in which the primary blow molded product is heated and thermally shrunk to mold a secondary intermediate molded product, and lastly, a secondary blow molding step in which this secondary intermediate molded product is blow molded into a final container shape.

After blow molding, the mold 3 is removed to obtain a multilayered container 5 ((5) in FIG. 1).

A second embodiment of the method for manufacturing a multilayered container of the present invention is an aspect of molding through hot parison molding. In hot parison molding, a parison is blow molded by preheating at the time of injection molding and adjusting the temperature prior to blowing in one stage without completely cooling the parison to room temperature, and the parison is molded without passing through the above-described step of (1) in FIG. 1.

In cold parison molding and hot parison molding, the parison temperature before blow molding is determined with consideration of the glass transition temperatures (Tg) of the polyester resin constituting the polyester resin layer and the polyamide resin constituting the barrier layer. The matter of before blow molding refers to, for example, immediately prior to being blown after passing through a preheating zone. The parison temperature is preferably a temperature more than the glass transition temperature ($Tg_{max}$) of the resin having the highest glass transition temperature among the polyester resin and the polyamide resin constituting the multilayered article of the present invention, and a temperature range of $Tg_{max}+0.1°$ C. to $50°$ C. is more preferable. Furthermore, a difference between the glass transition temperature (Tgmin) of the resin having the lowest glass transition temperature among the polyester resin and the polyamide resin, and the abovementioned $Tg_{max}$ is preferably not more than 40° C., and more preferably not more than 30° C. When the parison temperature and glass transition temperatures are set to satisfy such ranges, blow moldability tends to further improve.

Furthermore, when the polyester resin and/or the polyamide resin is a crystalline resin, a difference between a lowest temperature ($Tc_{min}$) among the crystallization temperatures (Tc) of the crystalline resins, and the lowest temperature ($Tg_{max}$) is preferably large. Specifically, $Tc_{min}$-$Tg_{max}$ is preferably 5° C. or higher, and more preferably 10° C. or higher. An upper limit of 100° C. for $Tc_{min}$-$Tg_{max}$ is practical. When the difference is set to such a range, blow moldability tends to further improve.

In addition, as the method for manufacturing a multilayered container of the present invention, the descriptions of paragraphs [0070]-[0074] of JP 2016-198912, paragraphs [0085] to [0119] of JP 2016-169027, and JP 60-232952 A can be referenced within a range that does not depart from the spirit of the present invention, and the contents thereof are incorporated herein.

EXAMPLES

The present invention is described in greater detail below through examples. The materials, usage amounts, proportions, processing details, processing procedures, and the like described in the examples below may be changed, as appropriate, as long as there is no deviation from the spirit of the present invention. Therefore, the scope of the present invention is not limited to the specific examples described below.
Raw Materials
Synthesis of MXD6 (Polyamide (A1))

A jacketed 50 L reactor equipped with a stirrer, a partial condenser, a cooler, a thermometer, a dripping tank, and a nitrogen gas introduction tube was charged with 15 kg of adipic acid, 13.1 g of sodium hypophosphite monohydrate, and 6.9 g of sodium acetate, and then sufficiently purged with nitrogen and heated to 180° C. under a small nitrogen gas flow to uniformly melt the adipic acid, after which 13.9 kg of meta-xylylenediamine was added dropwise over 170 minutes while the system was stirred. During this time, the internal temperature was continuously increased to 245° C. Note that the water produced by polycondensation was removed from the system through the partial condenser and the cooler. After the completion of dropwise addition of the meta-xylylenediamine, the internal temperature was further increased to 260° C., and the reaction was continued for 1 hour, after which a polymer was removed as a strand from a nozzle at the bottom of the reactor, and cooled with water and then pelletized to obtain a pelletized polymer.

Next, the polymer obtained through the above operation was inserted into a 50 L rotary tumbler equipped with a heating jacket, a nitrogen gas introduction tube, and a vacuum line, and the pressure in the system was reduced while rotating the tumbler, after which the pressure was returned to normal pressure using nitrogen of a purity of 99 vol. % or more. This operation was performed three times. Subsequently, the temperature inside the system was increased to 140° C. under nitrogen circulation. Next, the pressure inside the system was reduced, the temperature in the system was continuously raised to 190° C. and held for 30 minutes at 190° C., after which nitrogen was introduced to return the inside of the system to normal pressure, and then the reaction system was cooled to obtain a polyamide resin (A1) (MXD6).

The melting point of the obtained polyamide resin (A1) was 237° C., the number average molecular weight was 26000, and the glass transition temperature was 85° C.
Synthesis of MXD6I (IPA 6 mol %) (Polyamide (A2))

4.70 mol of adipic acid (AA) and 0.30 mol of isophthalic acid (IPA) were weighed and inserted into a jacketed 3 L reactor equipped with a stirrer, a partial condenser, a cooler, a dripping tank, and a nitrogen gas introduction tube, and then the reactor was sufficiently purged with nitrogen and the contents were melted while stirring and mixing at 160° C. under a small nitrogen gas flow, and a slurry was formed. To this, 4.97 mol of meta-xylylenediamine (MXDA) was added dropwise over 160 minutes while stirring. During this time, the internal temperature was continuously increased to 250° C. The water that distilled out along with the dropwise addition of the meta-xylylenediamine was removed from the system through the partial condenser and the cooler. After the completion of dropwise addition of the meta-xylylenediamine, the internal temperature was increased to 260° C., and the reaction was continued for 1 hour. The obtained polymer was removed as a strand from a nozzle at the lower part of the reactor, cooled by water, and then cut into a pellet shape, and polyamide resin pellets having a molar ratio of adipic acid to isophthalic acid of 94:6 were obtained.

Next, these pellets were placed into a stainless steel rotary drum type heating device and rotated at 5 rpm. The reaction system was sufficiently purged with nitrogen, and then heated from room temperature to 140° C. under a small nitrogen gas flow. When the temperature inside the reaction system reached 140° C., the pressure was reduced to 1 Torr (133.322 Pa) or less, and the temperature inside the system was further increased to 190° C. over a period of 130 minutes. After the temperature inside the system reached 190° C., a solid-state polymerization reaction was continued at that same temperature for 30 minutes.

After completion of the reaction, depressurization was ended, the temperature inside the system was reduced under a nitrogen gas flow, and when the temperature in the system reached 60° C., the pellets were extracted, and a polyamide resin (A2) (MXD6I (IPA 6 mol %)) was obtained. The relative viscosity of the polyamide resin (A2) (MXD6I (IPA 6 mol %)) was 2.68. The glass transition temperature was 92° C., and the melting point was 229° C. The relative viscosity was measured according to the method described in paragraph [0037] of WO 2017/141969.
Synthesis of MXD6I (IPA 50 mol %) (Polyamide (B1))

A reaction vessel equipped with a stirrer, a partial condenser, a total condenser, a thermometer, a dropping funnel, a nitrogen gas introduction tube, and a strand die was charged with weighed raw materials including 6001 g (41.06 mol) of adipic acid, 6821 g (41.06 mol) of isophthalic acid, 1.73 g of calcium hypophosphite ($Ca(H_2PO_2)_2$) (30 ppm by mass as a phosphorus atom concentration in the polyamide resin), and 1.11 g of sodium acetate, and then sufficiently purged with nitrogen, after which the reaction vessel was filled with nitrogen to an internal pressure of 0.4 MPa, and the inside of the system was heated to 190° C. while stirring under a small nitrogen gas flow. The molar ratio of sodium acetate/calcium hypophosphite was 1.33.

To this, 11185 g (82.12 mol) of meta-xylylenediamine was added dropwise under stirring, and the temperature inside the system was continuously increased while removing condensed water that was produced, to outside of the system. After dropwise addition of the meta-xylylenediamine was completed, the internal temperature was increased, and when the temperature reached 265° C., the pressure inside the reaction vessel was reduced. The internal temperature was then further increased, and a melt polycondensation reaction was continued for 10 minutes at 270° C. Subsequently, the inside of the system was pressurized with nitrogen, and the obtained polymer was removed from the strand die and pelletized to obtain approximately 21 kg of polyamide resin pellets (MXD6I (IPA 50 mol %). The obtained polyamide resin (B1) (MXD6I (IPA 50 mol %)) was vacuum dried at 115° C. for 24 hours.

It was found that the resin (MXD6I (IPA 50 mol %)) had a crystal melting enthalpy ΔHm of substantially 0 J/g in the process of increasing the temperature, and was amorphous. The number average molecular weight was 13500. The Tg was 127° C.

Other Raw Materials

PA6I/6T: Grivory G21, available from EMS-CHEMIE AG, molar ratio of isophthalic acid to terephthalic acid of 2:1. Amorphous, glass transition temperature: 125° C.

PET-1: Unipet BK2180, available from Mitsubishi Chemical Corporation, melting point of 248° C., glass transition temperature of 75° C., and inherent viscosity=0.83 dL/g. At the time of use, a material that had been dried in a dehumidifying dryer at 150° C. for 8 hours was used. The inherent viscosity was measured using an Ubbelohde-type viscometer with the polyester resin dissolved in a mixed solvent of phenol/1,1,2,2-tetrachloroethane=6/4 (mass ratio) and maintained at 25° C.

PET-2: Altester SN4500 available from Mitsubishi Gas Chemical Co., Inc., amorphous, glass transition temperature of 125° C., inherent viscosity=0.68 dL/g, spiroglycol (SPG) 45 mol %, naphthalene dicarboxylic acid (NDCA) 50 mol %. At the time of use, a material that had been dried in a dehumidifying dryer at 110° C. for 24 hours was used.

Measurements of Glass Transition Temperature and Melting Point, and Crystal Melting Enthalpy Differential scanning calorimetry measurements were carried out in accordance with JIS K7121 and K7122 using a differential scanning calorimeter. A differential scanning calorimeter was used to perform measurements. The resin pellets were crushed and placed into a measurement pan of the differential scanning calorimeter, and then pretreated by increasing the temperature to 300° C. at a temperature increase rate of 10° C./min under a nitrogen atmosphere, followed by rapid cooling, after which the measurements were performed. As the measurement conditions, the temperature was increased to 300° C. at a temperature increase rate of 10° C./min, and then maintained at 300° C. for 5 minutes, after which the temperature was reduced to 100° C. at a temperature decrease rate of −5° C./min, and measurements were then carried out to determine the glass transition temperature (Tg), the melting point (Tm), and the crystal melting enthalpy (ΔHm).

As the differential scanning calorimeter, the "DSC-60" available from Shimadzu Corporation was used.

Manufacturing of Multilayered Bottles (Cold Parison Molding) in Examples 1 to 4 and Comparative Examples 1 to 5

Manufacture of the Preform (Not Containing an Oxidation Reaction Accelerator)

An injection molding machine (model SE130DU-CI, available from Sumitomo Heavy Industries, Ltd.) with two injection cylinders, and a two-piece multilayered hot runner mold (available from Kortec, Inc.) were used to produce a preform partially having a three-layer structure of (Y)/(X)/(Y) under the conditions indicated below.

Specifically, first, as the material constituting the layer (Y), a polyester resin (PET-1 or PET-2) shown in Table 1 was injected from one of the injection cylinders, and while the injection state of the layer (Y) was maintained, a resin mixture obtained by dry blending polyamide resins (A1, A2, B1, PA6I6T) was injected as the material constituting the layer (X) that becomes the barrier layer, from the other injection cylinder along with the polyester resin (resin described in table 1) constituting the layer (Y). Lastly, a necessary amount of the polyester resin (resin described in table 1) constituting the layer (Y) was injected to fill the cavity, and thereby a preform (25 g) partially having a three-layer structure of (Y)/(X)/(Y) was obtained (preform of the shape indicated by reference numeral 1 in FIG. 1). The size of the preform included an overall length of 92 mm, an outer diameter of 22 mm, and a wall thickness of 3.9 mm.

Skin-side injection cylinder temperature: 285° C.
Core-side injection cylinder temperature: 265° C.
Resin flow path temperature in mold: 290° C.
Mold cooling water temperature: 15° C.
Cycle time: 33 s
Proportion of resin mixture constituting the barrier layer in the preform: 5 mass %

Manufacture of the Preform (Containing an oxidation reaction accelerator)

A preform was obtained by the same method as the above-described method for manufacturing a preform in which an oxidation reaction accelerator was not added, with the exception that as the material constituting the layer (X) that becomes the barrier layer, a resin mixture (resin mixture described in Table 1) was used in which, in addition to the polyamide resins, cobalt (II) stearate (available from Kanto Chemical Co., Inc.) was also dry blended as an oxidation reaction accelerator such that the concentration of the oxidation reaction accelerator was 200 ppm by mass.

Manufacture of Multilayered Bottles

The preform to which an oxidation reaction accelerator was not added and the preform to which an oxidation reaction accelerator was added were used, and respective bottles were molded.

Specifically, petaloid-type bottles were obtained by biaxially stretching and blow molding the obtained preforms using a twin screw stretch blow molding device (model EFB1000ET, available from Frontier Inc.). The overall length of each bottle was 223 mm, the outer diameter was 65 mm, and the internal volume was 500 mL (surface area: 0.04 m$^2$, body section average thickness: 0.33 mm), and the bottom part was petaloid shaped. No dimples were provided in the body section. The biaxial stretch blow molding conditions were as indicated below. The proportion of the layer (X) with respect to the total mass of the obtained bottle was 5 mass %.

Preform heating temperature:110° C.
Primary blow pressure:0.9 MPa
Secondary blow pressure:2.5 MPa
Primary blow delay time:0.30 sec
Primary blow time:0.30 sec
Secondary blow time:2.0 sec
Blow exhaust time:0.6 sec
Mold temperature:30° C.

Evaluation Immediately After Bottle Molding

The obtained multilayered bottles were evaluated as follows. Unless otherwise specified, a multilayered bottle molded using a pre-form without the addition of an oxidation reaction accelerator was evaluated.

Bottle Appearance (Transparency)

The obtained 3-layer bottles were visually observed, and the appearance was evaluated as follows.

A: Cloudiness was not observed in any part of the entire bottle, and the bottle exhibited excellent transparency and permeability.

B: Slight cloudiness was observed in a portion of the bottle.

C: Slight cloudiness was observed throughout the entire bottle.

D: Significant cloudiness was observed in a portion of the bottle, and slight cloudiness was observed in all other portions of the bottle.

E: Significant cloudiness was observed throughout the entire bottle.

Oxygen Barrier Property (With and Without Oxidation Reaction Accelerator)

An oxygen permeability measuring device (product name "OX-TRAN 2/61", available from MOCON Inc.) was used.

The bottles produced in the Examples and Comparative Examples were each filled with 100 mL of water, and under conditions of an oxygen partial pressure of 0.21 atm, a bottle internal humidity of 100% RH (relative humidity), an external humidity of 50% RH, and a temperature of 23° C., nitrogen at 1 atm was circulated inside the bottle at 20 mL/min, and the amount of oxygen included in the nitrogen after circulating inside the bottle for 200 hours was detected using a coulometric sensor, and thereby the oxygen permeability was measured.

Both multilayered bottles obtained using preforms without the addition of an oxidation reaction accelerator and multilayered bottles obtained using preforms to which an oxidation reaction accelerator was added were evaluated as follows.

S: 0.008 cc/(bottle·day·0.21 atm) or less

A: More than 0.008 cc/(bottle·day·0.21 atm) and less than or equal to 0.015 cc/(bottle·day·0.21 atm)

B: More than 0.015 cc/(bottle·day·0.21 atm) and less than or equal to 0.020 cc/(bottle·day·0.21 atm)

C: More than 0.020 cc/(bottle·day·0.21 atm) and less than or equal to 0.040 cc/(bottle·day·0.21 atm)

D: More than 0.040 cc/(bottle·day·0.21 atm)

Delamination Resistance

The delamination resistance of each of the obtained multilayered bottles was evaluated as follows.

First, each of the bottles obtained in the Examples and Comparative Examples was filled with 500 mL of colored carbonated water (4.2 gas volume), and capped, after which the bottles were allowed to sit for 48 hours at 23° C. Next, the bottles were then dropped horizontally from a height of 1 m so that the body section came into contact with the floor. The delaminated locations became cloudy and could be visually distinguished, and therefore the presence or absence of delamination of the bottles was determined visually. Note that every bottle for which delamination occurred even partially was identified as a delaminated bottle. The number of test bottles was five, and a value obtained by averaging the number of drop times until delamination occurred was used.

A: The number of drop times was 100 or more.

B: The number of drop times was from 50 to 99.

C: The number of drop times was from 20 to 49.

D: The number of drop times was 19 or fewer.

Hot Water Storage Performance Evaluation

Changes in Appearance and Fully Filled Volume of Multilayered Bottle

Each of the obtained bottles was filled with 500 mL of water having a temperature of 60° C., and then placed in an environment at 23° C. and 50% relative humidity for 24 hours, after which changes in the appearance and changes in the fully filled volume (fillable internal volume) were visually evaluated as follows. Further, appearance and change were evaluated as the same method except that the water was replaced with water having a temperature of 85° C.

Appearance

A: Cloudiness was not observed in any part of the entire bottle, and the bottle exhibited excellent transparency and permeability.

B: Slight cloudiness was observed in a portion of the bottle.

C: Slight cloudiness was observed throughout the entire bottle.

D: Significant cloudiness was observed in a portion of the bottle, and slight cloudiness was observed in all other portions of the bottle.

E: Significant cloudiness was observed throughout the entire bottle.

<Change in Fully Filled Volume>

A: The rate of change of the fully filled volume was less than 1%.

B: The rate of change of the fully filled volume was equal to or more than 1% and less than 3%.

C: The rate of change of the fully filled volume was equal to or more than 3% and less than 5%.

D: The rate of change of the fully filled volume was equal to or more than 5% and less than 10%.

E: The rate of change of the fully filled volume was equal to or more than 10%.

Manufacture of Multilayered Bottles Using Post-Storage Preforms (Cold Parison Molding)

The preforms (PF) obtained above were stored for four weeks in an environment at 23° C. and 50% relative humidity, and for four weeks in an environment at 40° C. and 80% relative humidity, respectively. Multilayered bottles were manufactured through cold parison molding in the same manner as described above, using the preforms after storage.

Evaluation of Preform Storage Performance

Post-Storage Preform Appearance

The appearance of the post-storage preforms was visually evaluated as described below, and the evaluation results are presented together with the appearance evaluation results for the preforms before storage (initial preforms).

A: Cloudiness was not observed in any part of the entire preform, and the preform exhibited excellent transparency and permeability.

B: Slight cloudiness was observed in a portion of the preform.

C: Slight cloudiness was observed throughout the entire preform.

D: Significant cloudiness was observed in a portion of the preform, and slight cloudiness was observed in all other portions of the preform.

E: Significant cloudiness was observed throughout the entire preform.

Blow Moldability Using Post-Storage Preform

The blow moldability of the post-storage preforms was evaluated as described below, and the evaluation results are presented together with the blow moldability evaluation results for the preforms before storage (initial preforms).

A: Cloudiness was not observed in any part of the entire bottle, and the bottle exhibited excellent transparency and permeability.

B: Slight cloudiness was observed in a portion of the bottle, and a good product was obtained by changing the heating temperature.

C: Slight cloudiness was observed throughout the entire bottle, and a good product was not obtained even by changing the heating temperature.

D: Significant cloudiness was observed in a portion of the bottle, and slight cloudiness was observed in all other portions of the bottle.

E: Bursting was observed with significant cloudiness in the entire bottle.

Appearance of Bottles Obtained Using Post-Storage Preforms (Transparency)

The appearance of bottles obtained using post-storage preforms was evaluated in the same manner as above. The post-storage appearance evaluation results are presented together with the appearance evaluation results for the pre-storage preforms (initial preforms).

Oxygen Barrier Property

The oxygen barrier property of the bottles obtained using the post-storage preforms was evaluated in the same manner as above. The evaluation results for the oxygen barrier property are presented together with the evaluation results for the oxygen barrier property of pre-storage preforms (initial preforms).

The results are shown in Table 1.

TABLE 1

| | | | | Example 1 | Example 2 | Example 3 | Example 4 | Comparative Example 1 |
|---|---|---|---|---|---|---|---|---|
| Molding method | | | | Cold | Cold | Cold | Cold | Cold |
| Outer layer and inner layer | | | | PET-1 | PET-1 | PET-1 | PET-2 | PET-1 |
| Barrier Layer | Polyamide (A1) MXD6 | | parts by mass | 90 | 80 | 70 | 70 | 100 |
| | Polyamide (A2) MXD6I (IPA 6 mol %) | | parts by mass | | | | | |
| | Polyamide (B1) MXD6I (IPA 50 mol %) | | parts by mass | 10 | 20 | 30 | 30 | |
| | PA6I6T | | parts by mass | | | | | |
| Evaluation immediately after bottle molding | Bottle appearance | | | A | A | A | A | A |
| | Bottle oxygen barrier property (without oxidation reaction accelerator) | | | A | A | A | A | A |
| | Bottle oxygen barrier property (with oxidation reaction accelerator) | | | S | S | S | S | S |
| | Bottle delamination resistance | | | B | A | A | A | C |
| Evaluation of preform storage performance | Preform (PF) appearance | Initial PF | | A | A | A | A | A |
| | | PF after storage for 4 weeks in 23° C./50% RH environment | | A | A | A | A | C |
| | | PF after storage for 4 weeks in 40° C./80% RH environment | | B | B | A | A | E |
| | Blow Moldability | Initial PF | | A | A | A | A | A |
| | | PF after storage for 4 weeks in 23° C./50% RH environment | | B | A | A | A | C |
| | | PF after storage for 4 weeks in 40° C./80% RH environment | | C | B | A | A | E |
| | Bottle appearance | Initial PF | | A | A | A | A | A |
| | | PF after storage for 4 weeks in 23° C./50% RH environment | | A | A | A | A | C |
| | | PF after storage for 4 weeks in 40° C./80% RH environment | | C | B | A | A | E |
| | Oxygen Barrier Property | Initial PF | | A | A | A | A | A |
| | | PF after storage for 4 weeks in 23° C./50% RH environment | | A | A | A | A | A |
| | | PF after storage for 4 weeks in 40° C./80% RH environment | | A | A | A | A | C |
| Evaluation after hot water storage | Change in bottle appearance (filled and stored with 60° C. water) | | | B | A | A | A | C |
| | Change in fully filled volume (filled and stored with 60° C. water) | | | B | B | B | A | C |
| | Change in bottle appearance (filled and stored with 85° C. water) | | | E | E | E | A | E |
| | Change in fully filled volume (filled and stored with 85° C. water) | | | E | E | E | B | E |

| | | | | Comparative Example 2 | Comparative Example 3 | Comparative Example 4 | Comparative Example 5 |
|---|---|---|---|---|---|---|---|
| Molding method | | | | Cold | Cold | Cold | Cold |
| Outer layer and inner layer | | | | PET-1 | PET-1 | PET-1 | PET-1 |
| Barrier Layer | Polyamide (A1) MXD6 | | parts by mass | 90 | 80 | | 70 |
| | Polyamide (A2) MXD6I (IPA 6 mol %) | | parts by mass | | | 100 | |
| | Polyamide (B1) MXD6I (IPA 50 mol %) | | parts by mass | | | | |
| | PA6I6T | | parts by mass | 10 | 20 | | 30 |
| Evaluation immediately after bottle molding | Bottle appearance | | | C | D | A | D |
| | Bottle oxygen barrier property (without oxidation reaction accelerator) | | | B | C | A | C |
| | Bottle oxygen barrier property (with oxidation reaction accelerator) | | | S | A | S | A |
| | Bottle delamination resistance | | | C | B | C | B |
| Evaluation of preform storage performance | Preform (PF) appearance | Initial PF | | C | C | A | C |
| | | PF after storage for 4 weeks in 23° C./50% RH environment | | C | C | C | C |
| | | PF after storage for 4 weeks in 40° C./80% RH environment | | D | D | E | C |

TABLE 1-continued

|  |  |  |  |  |  |  |
|---|---|---|---|---|---|---|
| | Blow Moldability | Initial PF | A | A | A | B |
| | | PF after storage for 4 weeks in 23° C./50% RH environment | B | A | C | C |
| | | PF after storage for 4 weeks in 40° C./80% RH environment | C | B | C | C |
| | Bottle appearance | Initial PF | C | C | A | C |
| | | PF after storage for 4 weeks in 23° C./50% RH environment | C | C | C | C |
| | | PF after storage for 4 weeks in 40° C./80% RH environment | D | C | D | D |
| | Oxygen Barrier Property | Initial PF | C | D | A | D |
| | | PF after storage for 4 weeks in 23° C./50% RH environment | C | D | A | D |
| | | PF after storage for 4 weeks in 40° C./80% RH environment | C | D | C | D |
| Evaluation after hot water storage | | Change in bottle appearance (filled and stored with 60° C. water) | B | B | B | A |
| | | Change in fully filled volume (filled and stored with 60° C. water) | B | B | C | B |
| | | Change in bottle appearance (filled and stored with 85° C. water) | E | E | E | E |
| | | Change in fully filled volume (filled and stored with 85° C. water) | E | E | E | E |

As is clear from the above results, the bottles of the present invention excelled in transparency, oxygen barrier properties, and delamination resistance (Examples 1 to 4). In particular, even if a bottle of the present invention used a preform that had been stored for four weeks, the appearance of the preform did not deteriorate, excellent storage performance was exhibited, blow moldability was not reduced, a bottle with excellent appearance was obtained, and the oxygen barrier property was excellent. The bottles of the present invention also excelled in the storage performance of a liquid having a relatively high temperature, and even when storing water at 60° C., the bottles exhibited minimal deterioration in appearance, and bottle deformation was also low.

In contrast, when only MXD6 was used in the barrier layer, excellent transparency and oxygen barrier properties were exhibited, but the delamination resistance was not sufficient (Comparative Example 1). Furthermore, the bottle of Comparative Example 1 exhibited inferior storage performance of liquid at a relatively high temperature of approximately 60° C.

On the other hand, when PA6I6T was compounded with MXD6, a slight improvement in delamination resistance was observed, but the transparency and oxygen barrier properties (no oxidation reaction accelerator) degraded (Comparative Examples 2, 3 and 5). In addition, the preform storage performance also tended to be inferior.

Meanwhile, even when MXD6I was used in the barrier layer, when the proportion of isophthalic acid was less than 35 mol % of structural unit derived from a dicarboxylic acid, there was a slight improvement in delamination resistance, but the appearance of the preform after four weeks of storage was inferior, and blow moldability using the preform after four weeks storage tended to be inferior (Comparative Example 4).

Manufacturing of Multilayered Bottles (Hot Parison Molding) in Examples 5 to 8 and Comparative Examples 6 to 11
Manufacture of Multilayered Bottle (with no oxidation reaction accelerator)

An injection molding machine having two injection cylinders, and a two-piece multilayered hot runner mold were used to produce a preform partially having a three-layer structure of (Y)/(X)/(Y) under the conditions indicated below. First, as the material constituting the layer (Y), a polyester resin (PET-1 or PET-2) was injected from one of the injection cylinders, and while the injection state of the layer (Y) was maintained, a resin mixture obtained by dry blending polyamide resins (A1, A2, B1, PA6I6T) was injected as the material constituting the layer (X) that becomes the barrier layer, from the other injection cylinder along with a polyester resin (resin described in table 2) constituting the layer (Y). Lastly, a necessary amount of the polyester resin (resin described in table 2) constituting the layer (Y) was injected to fill the cavity, and thereby a preform partially having a three-layer structure of (Y)/(X)/(Y) was obtained. After the temperature of the obtained preform was adjusted to a predetermined temperature, the preform was transferred to a blow mold, and blow molding was performed as a secondary process to manufacture a bottle (volume: 500 mL). An injection blowing-integrated molding machine that included a preform injection molding zone having an injection cylinder and an injection mold, and a blow molding zone having a temperature adjustment unit and a blow mold was used.

Container Molding Conditions

Skin-side injection cylinder temperature: 270° C.
Core-side injection cylinder temperature: 270° C.
Resin flow path temperature in mold: 275° C.
Injection mold cooling water temperature: 50° C.
Parison temperature before blowing: 140° C.
Blow mold cooling water temperature: 35° C.
Cycle time: 26 s
Proportion of resin mixture constituting the barrier layer in the preform: 5 mass %

Manufacture of Multilayered Bottle (With Oxidation Reaction Accelerator)

A preform was obtained by the same method as the above-described method for manufacturing a preform in which an oxidation reaction accelerator was not added, with the exception that as the material constituting the layer (X) that becomes the barrier layer, a resin mixture (resin mixture described in Table 2) was used in which, in addition to the polyamide resins, cobalt (II) stearate (available from Kanto Chemical Co., Inc.) was also dry blended as an oxidation reaction accelerator such that the concentration of the oxidation reaction accelerator was 200 ppm by mass.

Evaluation Immediately After Bottle Molding

The obtained multilayered bottles were evaluated as follows. Unless otherwise specified, a multilayered bottle molded using a pre-form without the addition of an oxidation reaction accelerator was evaluated.

Bottle Appearance (Transparency)

The bottle appearance of the multilayered bottles obtained through hot parison molding was evaluated in the same manner as the above-described multilayered bottles obtained through cold parison molding.

Oxygen Barrier Property (With and Without Oxidation Reaction Accelerator)

The oxygen barrier property of the multilayered bottles obtained through hot parison molding was evaluated in the same manner as the above-described multilayered bottles obtained through cold parison molding. Both multilayered bottles obtained using preforms without the addition of an oxidation reaction accelerator and multilayered bottles obtained using preforms to which an oxidation reaction accelerator was added were evaluated.

Bottle Delamination Resistance

The delamination resistance of the multilayered bottles obtained through hot parison molding was evaluated in the same manner as the above-described multilayered bottles obtained through cold parison molding.

Changes in Bottle Appearance and Fully Filled Volume

Each of the obtained bottles was filled with 320 mL of water having a temperature of 60° C., and then placed in an environment at 23° C. and 50% relative humidity for 24 hours, after which changes in the appearance and fully filled volume (fillable internal volume) were visually evaluated as follows. Further, changes in the appearance and fully filled volume were evaluated as the same method except that the water was replaced with water having a temperature of 85° C. The evaluations were performed in evaluation sections similar to those of the multilayered bottles obtained through cold parison molding described above.

The results are shown in Table 2 below.

TABLE 2

| | | | Example 5 | Example 6 | Example 7 | Example 8 | Comparative Example 6 | Comparative Example 7 |
|---|---|---|---|---|---|---|---|---|
| Molding method | | | Hot | Hot | Hot | Hot | Hot | Hot |
| Outer layer and inner layer | | | PET-1 | PET-1 | PET-2 | PET-2 | PET-1 | PET-1 |
| Barrier Layer | Polyamide (A1) MXD6 | parts by mass | 70 | 30 | 70 | 30 | — | 100 |
| | Polyamide (A2) MXD6I (IPA 6 mol %) | parts by mass | | | | | | |
| | Polyamide (B1) MXD6I (IPA 50 mol %) | parts by mass | 30 | 70 | 30 | 70 | | |
| | PA6I6T | parts by mass | | | | | | |
| Evaluation Items | Bottle appearance | | A | A | A | A | E | A |
| | Bottle oxygen barrier property (without oxidation reaction accelerator) | | A | A | A | A | D | A |
| | Bottle oxygen barrier property (with oxidation reaction accelerator) | | S | S | S | S | D | S |
| | Bottle delamination resistance | | A | A | A | A | — | C |
| | Change in bottle appearance (filled and stored with 60° C. water) | | A | A | A | A | A | C |
| | Change in fully filled volume (filled and stored with 60° C. water) | | A | A | A | A | A | A |
| | Change in bottle appearance (filled and stored with 85° C. water) | | E | E | C | A | E | E |
| | Change in fully filled volume (filled and stored with 85° C. water) | | E | E | A | A | E | E |
| | | | Comparative Example 8 | Comparative Example 9 | Comparative Example 10 | Comparative Example 11 |
| Molding method | | | Hot | Hot | Hot | Hot |
| Outer layer and inner layer | | | PET-1 | PET-2 | PET-2 | PET-2 |
| Barrier Layer | Polyamide (A1) MXD6 | parts by mass | | — | 100 | |
| | Polyamide (A2) MXD6I (IPA 6 mol %) | parts by mass | | | | |
| | Polyamide (B1) MXD6I (IPA 50 mol %) | parts by mass | | | | |
| | PA6I6T | parts by mass | 100 | — | | 100 |
| Evaluation Items | Bottle appearance | | D | E | A | D |
| | Bottle oxygen barrier property (without oxidation reaction accelerator) | | C | D | A | C |
| | Bottle oxygen barrier property (with oxidation reaction accelerator) | | B | D | S | B |
| | Bottle delamination resistance | | A | — | C | B |
| | Change in bottle appearance (filled and stored with 60° C. water) | | A | A | C | A |
| | Change in fully filled volume (filled and stored with 60° C. water) | | A | A | A | A |
| | Change in bottle appearance (filled and stored with 85° C. water) | | E | A | D | A |
| | Change in fully filled volume (filled and stored with 85° C. water) | | E | A | B | A |

As is clear from the above results, the bottles of the present invention excelled in transparency, oxygen barrier properties, and delamination resistance (Examples 5 to 8). Furthermore, the bottles of the present invention excelled in appearance even after being filled with water at a relatively high temperature of 60° C.

In contrast, when a barrier layer was not used, the barrier property was inferior (Comparative Examples 6 and 9).

Furthermore, when only MXD6 was used in the barrier layer, excellent transparency and oxygen barrier properties were exhibited, but the delamination resistance was not sufficient (Comparative Examples 7 and 10).

Moreover, when PA6I6T was used in the barrier layer, the oxygen barrier property was inferior (Comparative Examples 8 and 11).

The multilayered article of the present invention exhibits a high oxygen barrier property and high delamination resistance, and therefore can be widely used for in various multilayered containers or the like. Furthermore, a multilayered container excelling in appearance can be achieved.

In addition, even if the multilayered container of the present invention is filled with contents, changes in appearance and the fully filled volume of the multilayered container can be suppressed, and thus various contents can be stored. In particular, even if contents having a temperature of approximately 60° C. are stored, the utility value is high in that changes in the appearance and fully filled volume of the multilayered container are suppressed.

REFERENCE SIGNS LIST

1 Preform
2 Heater
3 Mold
4 Stretching rod
5 Multilayered container

The invention claimed is:

1. A multilayered article comprising a layer containing a polyester resin as a main component and a layer containing a polyamide resin as a main component, wherein
the polyamide resin included in the layer containing a polyamide resin as a main component includes not more than 30 parts by mass and more than 25 parts by mass of a polyamide resin (B), per not less than 70 parts by mass and less than 75 parts by mass of a polyamide resin (A);
the polyamide resin (A) includes a structural unit derived from a diamine and a structural unit derived from a dicarboxylic acid, 70 mol % or more of the structural unit derived from a diamine being derived from xylylenediamine, and more than 90 mol % of the structural unit derived from a dicarboxylic acid being derived from adipic acid; and
the polyamide resin (B) includes a structural unit derived from a diamine and a structural unit derived from a dicarboxylic acid, 70 mol % or more of the structural unit derived from a diamine being derived from xylylenediamine, and of the structural unit derived from a dicarboxylic acid, from 30 to 65 mol % being derived from an $\alpha,\omega$-linear aliphatic dicarboxylic acid having from 4 to 20 carbons, and from 70 to 35 mol % being derived from isophthalic acid, a total of which does not exceed 100 mol %.

2. The multilayered article according to claim 1, wherein at least 70 mol % of the structural unit derived from the diamine in the polyamide resin (A) is derived from meta-xylylenediamine.

3. The multilayered article according to claim 1, wherein at least 70 mol % of the structural unit derived from the diamine in the polyamide resin (B) is derived from meta-xylylenediamine.

4. The multilayered article according to claim 1, wherein from 30 to 65 mol % of the structural unit derived from the dicarboxylic acid in the polyamide resin (B) is derived from adipic acid.

5. The multilayered article according to claim 1, wherein
90 mol % or more of the structural unit derived from a diamine in the polyamide resin (A) is derived from meta-xylylenediamine;
90 mol % or more of the structural unit derived from a diamine in the polyamide resin (B) is derived from meta-xylylenediamine; and
of the structural unit derived from a dicarboxylic acid in the polyamide resin (B), from 30 to 65 mol % is derived from adipic acid, and from 70 to 35 mol % is derived from isophthalic acid.

6. The multilayered article according to claim 5, wherein, of the structural unit derived from a dicarboxylic acid in the polyamide resin (B), from 30 to 59 mol % is derived from adipic acid, and from 70 to 41 mol % is derived from isophthalic acid.

7. The multilayered article according to claim 5, wherein the polyamide resin (B) is an amorphous polyamide resin.

8. The multilayered article according to claim 5, further comprising a layer containing a second polyester resin as a main component, the multilayered article including the layers positioned in an order of the layer containing a polyester resin as a main component, the layer containing a polyamide resin as a main component, and the layer containing a second polyester resin as a main component.

9. The multilayered article according to claim 5, wherein the multilayered article is stretched.

10. The multilayered article according to claim 1, wherein, of the structural unit derived from a dicarboxylic acid in the polyamide resin (B), from 30 to 59 mol % is derived from adipic acid, and from 70 to 41 mol % is derived from isophthalic acid.

11. The multilayered article according to claim 10, wherein the polyamide resin (B) is an amorphous polyamide resin.

12. The multilayered article according to claim 10, further comprising a layer containing a second polyester resin as a main component, the multilayered article including the layers positioned in an order of the layer containing a polyester resin as a main component, the layer containing a polyamide resin as a main component, and the layer containing a second polyester resin as a main component.

13. The multilayered article according to claim 10, wherein the multilayered article is stretched.

14. The multilayered article according to claim 1, wherein the polyamide resin (B) is an amorphous polyamide resin.

15. The multilayered article according to claim 1, further comprising a layer containing a second polyester resin as a main component, the multilayered article including the layers positioned in an order of the layer containing a polyester resin as a main component, the layer containing a polyamide resin as a main component, and the layer containing a second polyester resin as a main component.

16. The multilayered article according to claim 1, wherein the multilayered article is stretched.

17. A multilayered container comprising the multilayered article as in claim 1.

18. The multilayered container according to claim 17, wherein the container is a bottle.

19. The multilayered container according to claim 17, wherein 90 mol % or more of the structural unit derived from a diamine in the polyamide resin (A) is derived from meta-xylylenediamine;

90 mol % or more of the structural unit derived from a diamine in the polyamide resin (B) is derived from meta-xylylenediamine; and of the structural unit derived from a dicarboxylic acid in the polyamide resin (B), from 30 to 65 mol % is derived from adipic acid, and from 70 to 35 mol % is derived from isophthalic acid.

20. The multilayered container according to claim 17, wherein the polyamide resin (B) is an amorphous polyamide resin.

21. A multilayered article comprising a layer containing a polyester resin as a main component and a layer containing a polyamide resin as a main component, wherein the polyamide resin included in the layer containing a polyamide resin as a main component includes not more than 30 parts by mass and more than 25 parts by mass of a polyamide resin (B), per not less than 70 parts by mass and less than 75 parts by mass of a polyamide resin (A);

the polyamide resin (A) includes a structural unit derived from a diamine and a structural unit derived from a dicarboxylic acid, 70 mol % or more of the structural unit derived from a diamine being derived from xylylenediamine, and more than 90 mol % of the structural unit derived from a dicarboxylic acid being derived from adipic acid; and the polyamide resin (B) includes a structural unit derived from a diamine and a structural unit derived from a dicarboxylic acid, 70 mol % or more of the structural unit derived from a diamine being derived from xylylenediamine, and of the structural unit derived from a dicarboxylic acid, from 30 to 65 mol % being derived from an $\alpha,\omega$-linear aliphatic dicarboxylic acid having from 4 to 20 carbons, and from 70 to 35 mol % being derived from isophthalic acid, a total of which does not exceed 100 mol %, wherein the polyamide resin (B) contains phosphorus atoms at a proportion from 3 to 300 ppm by mass.

* * * * *

UNITED STATES PATENT AND TRADEMARK OFFICE
CERTIFICATE OF CORRECTION

| | | |
|---|---|---|
| PATENT NO. | : 12,017,433 B2 | Page 1 of 1 |
| APPLICATION NO. | : 17/049754 | |
| DATED | : June 25, 2024 | |
| INVENTOR(S) | : Takanori Miyabe et al. | |

It is certified that error appears in the above-identified patent and that said Letters Patent is hereby corrected as shown below:

On the Title Page

On Page 2, item (57), Column 1, Line 6, delete "am-"; and insert -- α,ω- --, therefor.

Signed and Sealed this
Twenty-first Day of January, 2025

Coke Morgan Stewart
*Acting Director of the United States Patent and Trademark Office*